United States Patent [19]

Meguriya et al.

[11] Patent Number: 5,585,445
[45] Date of Patent: Dec. 17, 1996

[54] HYDROSILATION

[75] Inventors: Noriyuki Meguriya; Takeo Yoshida; Yoshiteru Kobayashi, all of Gunma-ken, Japan

[73] Assignee: Shin-Etsu Chemical Co. Ltd., Tokyo, Japan

[21] Appl. No.: 513,558

[22] Filed: Aug. 10, 1995

[30]     Foreign Application Priority Data

Aug. 11, 1994 [JP] Japan .................................. 6-189189

[51] Int. Cl.$^6$ .............................. C08K 5/24; C08G 77/04
[52] U.S. Cl. ............................. 525/476; 525/478; 528/15
[58] Field of Search .................................. 525/476, 478; 528/15

[56]             References Cited

U.S. PATENT DOCUMENTS

| Re. 31,543 | 3/1984 | Bank et al. | 525/435 |
|---|---|---|---|
| 3,971,747 | 7/1976 | Bank et al. | 260/37 |
| 4,082,719 | 4/1978 | Liles et al. | 260/37 |
| 4,082,726 | 4/1978 | Mine et al. | 525/476 |
| 5,248,715 | 9/1993 | Gray et al. | 524/265 |
| 5,416,147 | 5/1995 | Takarada et al. | 524/399 |

OTHER PUBLICATIONS

Chemical Abstracts 103:142861, "Addition–Curing–Type Siloxanes with High Adhesion".
Lee and Neville, "The Handbook of Epoxy Resins", McGraw–Hill Inc. 1967, pp. 15–15.

*Primary Examiner*—Frederick Krass
*Attorney, Agent, or Firm*—Millen, White, Zelane, & Branigan, P.C.

[57]             ABSTRACT

A novel curable organopolysiloxane-epoxy resin composition, which is capable of giving a cured body having excellent mechanical properties without the problem of adhesion to the metal mold, is proposed. The composition comprises: (a) an epoxy resin; (b) an organopolysiloxane containing vinyl groups; (c) an organohydrogenpolysiloxane as the crosslinking agent of the component (b); (d) a platinum compound as a catalyst for the hydrosilation reaction; and (e) a specific organic aluminum compound, such as tris(acetylacetonato) aluminum, each in a specified proportion.

8 Claims, No Drawings

HYDROSILATION

BACKGROUND OF THE INVENTION

The present invention relates to a novel curable resin composition comprising an organopolysiloxane and an epoxy resin and capable of giving a cured article of the composition which is excellent in various properties such as mechanical strengths, moisture resistance, heat resistance and mold releasability as well as transparency to be useful in a variety of application fields.

As is known, epoxy resin-based curable compositions in general give cured articles having excellent properties such as mechanical strengths, adhesiveness and the like as compared with other thermally curable resins so that, along with the advantage of the relatively low costs, they are practically used in large quantities in various application fields including coating compositions and adhesives, electrical industries, architectural and civil engineerings and so on. As the application field of epoxy resins is expanded year by year, the requirements-for the epoxy resins are also under continuous upgrading toward higher heat resistance, weatherability, moisture resistance and flexibility of the cured articles thereof as well as workability in the molding works thereof in relation to the mold releasability.

It is also known that, on the other hand, silicone resins are widely used as a material of electric and electronic instruments, transportation machines, precision machines and the like by virtue of their excellent heat resistance, weatherability, moisture resistance and electrical properties. Silicone resins, however, are not always quite satisfactory in these applications because the mechanical strength of the cured articles of a silicone resin is relatively low as compared with organic resins. This deficiency of silicone resins of course can be remedied to some extent by compounding the silicone resin with a reinforcing inorganic filler such as finely divided silica fillers but the reinforcing effect given by such an inorganic filler is not so high in silicone resins as in silicone rubbers and compounding of a silicone resin with a large amount of an inorganic filler necessarily causes difficult problems in respect of the workability in the molding works due to the decrease in the flowability of the silicone resin composition at the molding temperature.

It would be a due idea that the above mentioned defects of silicone resins in general could be remedied by blending the silicone resin with a suitable organic resin capable of compensating the deficiency of the silicone resin. Within the approach in this way, various kinds of organic resins have been proposed and tested heretofore as a blending component in silicone resins of which epoxy resins are a class of promising ones. Epoxy resins as a compounding resin with silicones, however, have a problem in respect of their relatively low compatibility or miscibility with silicone resins so that uniform resin blends can hardly be obtained from a silicone resin and an epoxy resin.

An alternative method is proposed in which the organopolysiloxane molecules of the silicone resin are modified with epoxy groups so as to improve the compatibility of the silicone resin and an epoxy resin. This approach is not practical because of the remarkable decrease in the mechanical strength of the epoxy resin due to the silicone resin if not to mention the expensiveness of such an epoxy-modified silicone resin as a consequence of the specific modification reaction.

SUMMARY OF THE INVENTION

The present invention accordingly has an object to provide, as a solution of the above described problems in the prior art, a novel and improved curable organopolysiloxane-epoxy resin composition capable of giving a cured article having excellent heat resistance, moisture resistance and mold releasability as well as transparency without decreasing the inherently excellent mechanical properties of epoxy resins.

Thus, the present invention provides a curable organopolysiloxane-epoxy resin composition which comprises, as a uniform blend:

(a) 100 parts by weight of an epoxy resin;
(b) from 10 to 500 parts by weight of an organopolysiloxane represented by the average compositional formula $$R_a(HO)_b SiO_{(4-a-b)/2}, \quad (I)$$

in which R is an unsubstituted or substituted monovalent hydrocarbon group having 1 to 10 carbon atoms, at least 1% by moles of the groups denoted by R in a molecule being alkenyl groups, the subscript a is a positive number not smaller than 1 but smaller than 3 or, preferably, not smaller than 1.5 but smaller than 2.5 and the subscript b is a positive number in the range from 0.05 to 2 or, preferably, from 0.1 to 1.5 with the proviso that a+b is larger than 1 but not exceeding 3 or, preferably, from 1.7 to 2.2;

(c) an organohydrogenpolysiloxane having, in a molecule, at least two or, preferably, at least three hydrogen atoms directly bonded to the silicon atoms in an amount in the range from 1 to 50% by weight based on the amount of the component (b);

(d) a compound of a platinum-group metal in an amount in the range from 0.1 to 500 ppm by weight based on the amount of the component (b); and (e) from 0.001 to 10 parts by weight of an organic aluminum compound.

DETAILED DESCRIPTION OF THE PREFERRED EMBODIMENTS

The component (a) is an epoxy resin which can be selected without particular limitations from those conventionally used as an ingredient in a thermally curable epoxy resin composition but it is preferable as the component (a) that the epoxy equivalent of the epoxy resin is in the range from about 120 to about 800 or, more preferably, from 150 to 350. Particular examples of suitable epoxy resins include bisphenol A-type epoxy resins, bisphenol F-type epoxy resins, phenol novolac-type epoxy resins, alicyclic epoxy resins, epoxy resins containing heterocyclic rings in the structure such as triglycidyl isocyanate and hydantoin epoxy, hydrogenated bisphenol A-type epoxy resins, aliphatic epoxy resins such as propyleneglycol diglycidyl ether and pentaerithritol polyglycidyl ether, epoxy resins obtained by the reaction between an aromatic, aliphatic or alicyclic carboxylic acid and epichlorohydrin, spiro ring-containing epoxy resins, glycidyl ether-type epoxy resins as a reaction product of an o-allylphenol novolac compound and epichlorohydrin, glycidyl ether-type epoxy resins as a reaction product of a diallyl bisphenol compound having allyl groups at the o-positions relative to the hydroxy groups in bisphenol A and epichlorohydrin and so on.

The component (b) is an organopolysiloxane which is represented by the above given average compositional formula (I). The organopolysiloxane includes those in the form of a solid at room temperature and those in the form of a liquid at room temperature. In the average compositional formula, R is an unsubstituted or substituted monovalent hydrocarbon group having 1 to 10 or, preferably, 1 to 6 carbon atoms. It is essential that at least 1% by moles or, preferably, from 2 to 80% by moles or, more preferably, from 2 to 20% by moles of the groups denoted by R in a molecule are alkenyl groups such as vinyl groups.

Examples of the monovalent hydrocarbon groups suitable as R include saturated hydrocarbon groups exemplified by alkyl groups such as methyl, ethyl, n-propyl, isopropyl, n-butyl, isobutyl, tert-butyl, pentyl, neopentyl, hexyl, octyl, nonyl and decyl groups and cycloalkyl groups such as cyclopentyl and cyclohexyl groups, alkenyl groups such as vinyl, allyl, propenyl, isopropenyl, butenyl, isobutenyl, hexenyl and cyclohexenyl groups, aryl groups such as phenyl, tolyl, xylyl, and naphthyl groups, and aralkyl groups such as benzyl and phenylethyl groups as well as those substituted hydrocarbon groups obtained by replacing a part or all of the hydrogen atoms in the above named unsubstituted hydrocarbon groups with halogen atoms, cyano groups and the like exemplified by chloromethyl, chloropropyl, 3,3,3-trifluoropropyl and 2-cyanoethyl groups. Preferable as the group denoted by R are methyl, phenyl, vinyl and 3,3,3-trifluoropropyl groups in respect of the good miscibility of the component (b) with the component (a) and the properties of the resin composition after curing.

The subscript a in the average unit formula (I) is a positive number not smaller than 1 but smaller than 3 and the subscript b is in the range from 0.05 to 2 with the proviso that a+b is larger than 1 but not exceeding 3 or, preferably, a is not smaller than 1.5 but smaller than 2.5 and b is from 0.1 to 1.5 with the proviso that a+b is from 1.7 to 2.2. When the value of b, which corresponds to the content of the silanolic hydroxy groups, is too small, the intercrosslinkability between the components (a) and (b) is poor and a great retardation is caused in the crosslinking reaction per se. When the value of b is too large, on the other hand, the stability of the organopolysiloxane as the component (b) is decreased eventually to cause gelation during storage.

The above defined organopolysiloxane as the component (b) can be prepared according to a known method. For example, vinyl methyl dichlorosilane and phenyl trichlorosilane, optionally, with admixture of tetrachlorosilane, methyl trichlorosilane, dimethyl dichlorosilane, trimethyl chlorosilane, diphenyl dichlorosilane, methyl phenyl dichlorosilane and the like is subjected to cohydrolysis-cocondensation in the presence of an alkaline or acidic catalyst to leave a certain amount of the silanolic hydroxy groups. It is optional that the above named organo chlorosilanes are replaced each with a corresponding alkoxy silane. It is preferable that the mixture of the hydrolyzable organosilane compounds contains at least one kind of trifunctional or tetrafunctional silane compounds.

The content of the silanolic hydroxy groups in the organopolysiloxane as the component (b) can be controlled in various ways other than the formulation of the starting hydrolyzable organosilane compounds, for example, by controlling the reaction temperature or by adjusting the amount of the catalyst. When the content of the silanolic hydroxy groups is so high as to cause eventual gelation of the organopolysiloxane, it is optional to decrease the silanol groups by the silylation reaction of the silanol groups with a silylating agent such as trimethyl chlorosilane, hexamethyl disilazane, divinyl tetramethyl disilazane and the like.

The compounding amount of the organopolysiloxane as the component (b) is in the range from 10 to 500 parts by weight or, preferably, from 20 to 200 parts by weight per 100 parts by weight of the curable epoxy resin as the component (a). When the amount of the component (b) is too small relative to the component (a), the article obtained by curing the resin composition cannot be imparted with high heat resistance and mold releasability as inherent properties in organopolysiloxanes. When the amount of the organopolysiloxane as the component (b) is too large, on the other hand, the mechanical strengths of the cured article of the composition would not be high enough due to the deficiency in the content of the epoxy resin.

The component (c) is an organohydrogenpolysiloxane having, in a molecule, at least two or, preferably, at least three hydrogen atoms directly bonded to the silicon atoms. This component serves as a crosslinking agent of the organopolysiloxane as the component (b) by the hydrosilation reaction between the silicon-bonded hydrogen atoms in the component (c) and the alkenyl groups in the component (b). The molecular structure of this organohydrogenpolysiloxane is not particularly limitative and can be straightly linear, cyclic, branched or three-dimensionally network-like. The degree of polymerization of or, namely, the number of silicon atoms in a molecule of the organohydrogenpolysiloxane is usually in the range from 2 to 200 or, preferably, from 2 to 20 in consideration of the miscibility with the other ingredients or, in particular, with the epoxy resin as the component (a) or transparency of the composition. The number of the silicon-bonded hydrogen atoms in a molecule thereof should not exceed 200 or, preferably, 20 from the standpoint of obtaining a cured article of the composition having high mechanical strengths.

The organic groups bonded to the silicon atoms in the organohydrogenpolysiloxane can be selected from the same hydrocarbon groups as given as the examples of the group denoted by R in the average compositional formula (I) representing the organopolysiloxane as the component (b). Preferably, the organic groups are selected from methyl, phenyl and 3,3,3-trifluoropropyl groups. When the organohydrogenpolysiloxane has a straightly linear molecular structure, the body of the molecules thereof is constructed from a sequence of difunctional siloxane units such as dimethyl siloxane units, methyl hydrogen siloxane units, diphenyl siloxane units, methyl phenyl siloxane units, methyl 3,3,3-trifluoropropyl siloxane units and the like terminated at each molecular chain end with a monofunctional siloxy group such as a trimethyl siloxy group, dimethyl hydrogen siloxy group and the like.

Particular examples of the organohydrogenpolysiloxane as the component (c) include methyl hydrogen polysiloxanes terminated at each molecular chain end with trimethyl siloxy group, dimethyl polysiloxane-methyl hydrogen polysiloxanes copolymers terminated at each molecular chain end with a trimethyl siloxy group, methyl hydrogen polysiloxanes terminated at each molecular chain end with a dimethyl hydrogen siloxy group, dimethyl polysiloxane-methyl hydrogen polysiloxane copolymers terminated at each molecular chain end with a dimethyl hydrogen siloxy group and, dimethyl polysiloxane-methyl hydrogen polysiloxane-diphenyl polysiloxane copolymers terminated at each molecular chain end with trimethyl siloxy group as well as those copolymeric organopolysiloxanes containing trifunctional and/or tetrafunctional siloxane units consisting, denoting a methyl and phenyl groups with Me and Ph, respectively, of a combination of the $Me_2HSiO_{0.5}$ units and $SiO_2$ units, a combination of $Me_2HSiO_{0.5}$ units, $Me_2SiO$ units and $SiO_2$ units and a combination of $Me_2HSiO_{0.5}$ units, $PhSiO_{1.5}$ units and $SiO_2$ units.

The compounding amount of the organohydrogenpolysiloxane as the component (c) in the inventive resin composition is in the range from 1 to 50% by weight or, preferably, from 5 to 30% by weight based on the amount of the organopolysiloxane as the component (b). Alternatively, the component (c) is compounded in such a formulation that the silicon-bonded hydrogen atoms therein are provided in an amount of from 0.2 to 10 moles or, preferably, from 0.5 to 5 moles per mole of the alkenyl groups in the organopolysiloxane as the component (b). When the amount of the component (c) is too small, fully cured articles can hardly be obtained from the resin composition due to the deficiency in the crosslinking agent. When the amount of the component (c) is too large, cured articles of the resin composition cannot be imparted with high mechanical strengths.

The component (d) is a compound of a platinum-group metal such as platinum, rhodium and palladium, which serves as a catalyst to promote the hydrosilation reaction between the alkenyl groups in the organopolysiloxane as the component (b) and the silicon-bonded hydrogen atoms in the organohydrogenpolysiloxane as the component (c). Examples of suitable metal compounds include platinum black, platinum (IV) chloride, chloroplatinic acid, addition products of chloroplatinic acid and a monohydric alcohol, complexes of chloroplatinic acid and an olefin compound and platinum bisacetoacetate as well as compounds of palladium and rhodium similar to the above named platinum compounds. The compounding amount of the component (d) in the inventive resin composition is in the range from 0.1 to 500 ppm by weight or, preferably, from 0.5 to 200 ppm by weight calculated as the metal of platinum, palladium or rhodium based on the amount of the organopolysiloxane as the component (b). When the amount of the component (d) is too small, full curing of the resin composition can hardly be accomplished even by prolonged heating while increase of the amount thereof to exceed the above given upper limit has no particular additional advantages rather with an economical disadvantage due to the expensiveness of these noble metal compounds.

The component (e) in the inventive resin composition is an organic aluminum compound having a chemical bond between an aluminum atom and an organic group such as alkyl groups, aryl groups, e.g., unsubstituted or substituted phenyl group, halogen-substituted alkyl groups, alkoxy groups, aryloxy groups, e.g., unsubstituted or substituted phenoxy groups, acyloxy groups, β-diketonato groups, o-carbonylphenolato groups and the like. The above mentioned alkyl group is exemplified by methyl, ethyl, n-propyl, isopropyl, n-butyl, sec-butyl, tert-butyl and n-pentyl groups. The unsubstituted or substituted phenyl group is exemplified by phenyl, p-methoxyphenyl, o-methoxyphenyl and p-ethoxyphenyl groups. The halogen-substituted alkyl group is exemplified by chloromethyl, chloroethyl and chloropropyl groups. The alkoxy group is exemplified by methoxy, ethoxy, isopropoxy, butoxy and pentoxy groups. The unsubstituted or substituted phenoxy group is exemplified by phenoxy, o-methylphenoxy, o-methoxyphenoxy, o-nitrophenoxy and 2,6-dimethylphenoxy groups. The acyloxy group is exemplified by acetato, propionato, butyrato, stearato, ethyl acetoacetato, propyl acetoacetato, butyl acetoacetato, diethyl maleato and dipivaloyl methanato groups. The β-diketonato group is exemplified by acetylacetonato, trifluoroacetylacetonato and hexafluoroacetylacetonato groups as well as those expressed by the formulas Ph—CO—CH$_2$—CO—Me, Me—CO—CHMe—CO—Me and Me$_3$C—CO—CH$_2$—CO—CMe$_3$, in which Me and Ph denote methyl group and phenyl group, respectively, in the form before coordination. The o-carbonylphenolato group is exemplified by salicylaldehydato group. As is well-known in this art, the aluminum compound catalyzes the reaction of silanol and epoxy groups.

Particular examples of the organic aluminum compound suitable as the component (e) in the inventive resin composition include trimethoxy aluminum, triethoxy aluminum, triisopropoxy aluminum, triphenoxy aluminum, tri(p-methylphenoxy) aluminum, isopropoxy diethoxy aluminum, tributoxy aluminum, triacetoxy aluminum, tristearato aluminum, tributyrato aluminum, tripropionato aluminum, triisopropionato aluminum, tris(acetylacetonato) aluminum, tris(trifluoroacetylacetonato) aluminum, tris(salicylaldehydato) aluminum, tris(pentafluoroacetylacetonato) aluminum, tris(ethylacetato) aluminum, ethylacetato diisopropoxy aluminum, tris(diethylmalolato) aluminum, tris(propylacetoacetato) aluminum, tris(butylacetacetato) aluminum, tris(isopropylacetoacetato) aluminum, tris(dipivaloylmethanato) aluminum, diacetylacetonato dipivaloylmethanato aluminum and ethylacetoacetato diisopropoxy aluminum as well as those complex compounds of aluminum expressed by the following formulas:

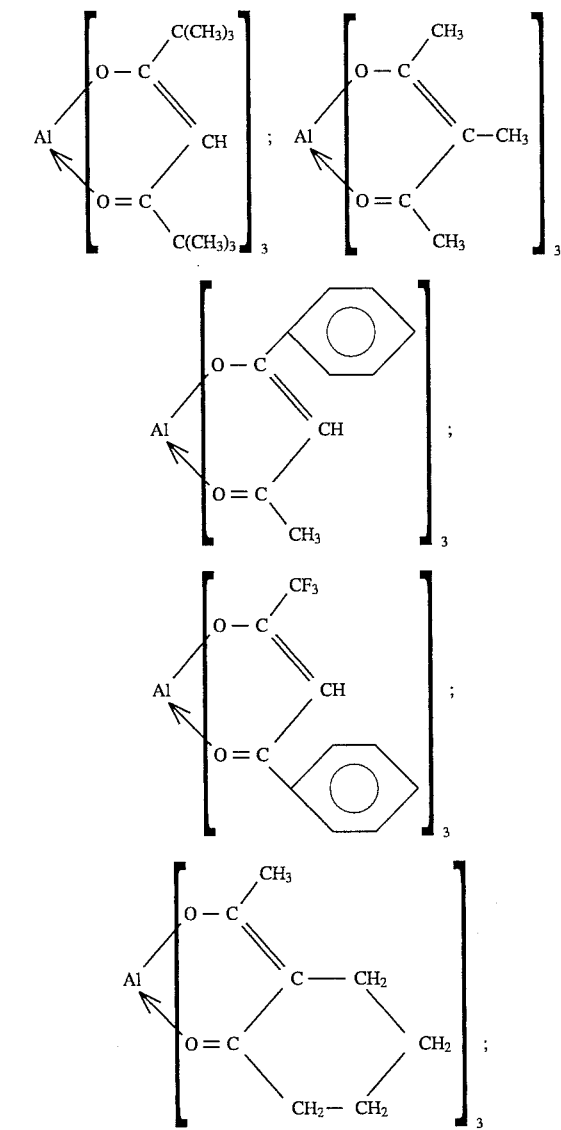

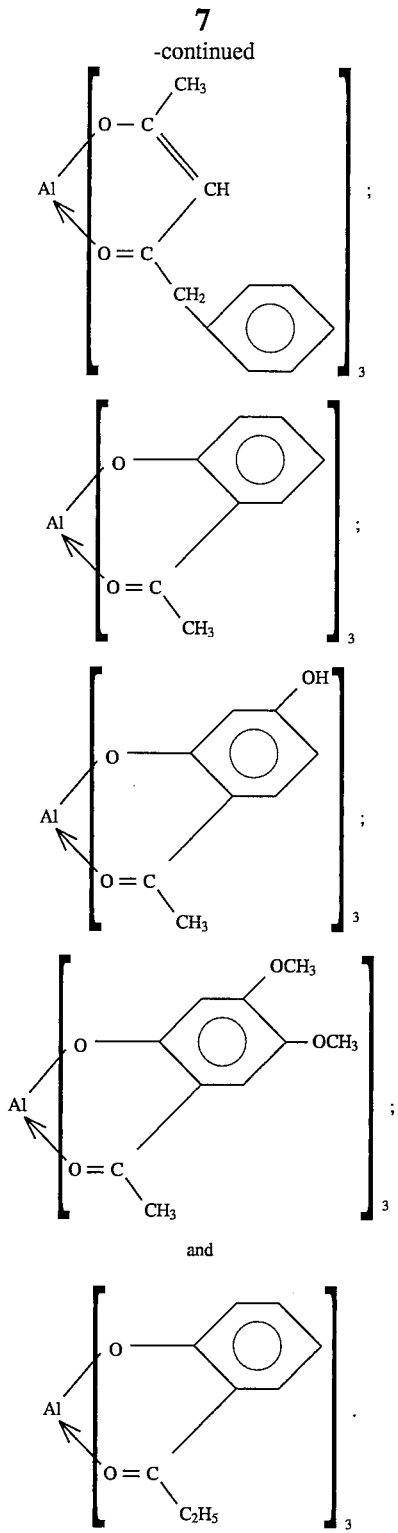

These organic aluminum compounds can be used either singly or as a combination of two kinds or more according to need. The amount of the organic aluminum compound as the component (e) in the inventive resin composition is in the range from 0.001 to 10 parts by weight or, preferably, from 0.1 to 5 parts by weight per 100 parts by weight of the epoxy resin as the component (a). When the amount of the component (e) is too small, the resin composition cannot exhibit good curability while the resin composition after curing would have decreased mechanical properties and increased adhesiveness by increasing the amount thereof to exceed the above mentioned upper limit in addition to an economical disadvantage.

It is optional that the inventive resin composition consisting of the above described components (a) to (e) is further admixed with an inorganic filler with an object to modify the flowability of the composition or to improve the mechanical strength of the inventive composition after curing. Suitable inorganic fillers having a reinforcing effect are exemplified by precipitated and fumed silica fillers and calcined silica fillers either as such or after a surface treatment with an organosilicon compound such as hexamethyl disilazane, trimethyl chlorosilane, polymethyl siloxanes and the like. Other optional additives to be compounded in the inventive composition according to need include pigments, heat resistance improvers, flame retardant agents and plasticizers as well as non-reinforcing fillers such as finely pulverized quartz, diatomaceous earth, iron oxide, zinc oxide, calcium carbonate and the like.

When transparency is desired of the inventive resin composition after curing, the inventive composition is formulated with an organopolysiloxane as the component (b) of which at least 10% by moles or, in particular, from 10 to 95% by moles or, preferably, from 20 to 80% by moles of the groups denoted by R in the average compositional formula (I) are phenyl groups presumably by virtue of the increased compatibility of the organopolysiloxane as the component (b) with the epoxy resin as the component (a).

In the following, the curable resin composition of the present invention is described in more detail by way of examples, which, however, never limit the scope of the invention in any way. In the following description, the term of "parts" always refers to "parts by weight". Measurements of the Shore D hardness and flexural strength of the resin composition after curing were conducted according to the procedures specified in JIS K 7216 and JIS K 6911, respectively.

EXAMPLE 1

A curable resin composition, referred to as the resin composition A hereinafter, was prepared by uniformly blending:

100 parts of a commercial product of a bisphenol A-type epoxy resin having an epoxy equivalent of 190 to 210 and an average molecular weight of 380 (Epikote 828, a product by Shell Chemical Co.);

20 parts of a diepoxide compound 3,4-epoxycyclohexylmethyl 3,4-epoxycyclohexane carboxylate;

30 parts of an organopolysiloxane expressed by the average compositional formula $Vi_{0.1}Me_{0.6}Ph_{0.55}(HO)_{0.25}SiO_{1.25}$, in which Vi, Me and Ph are vinyl, methyl and phenyl groups, respectively, obtained by the cohydrolysis of a mixture of vinyl methyl dichlorosilane, dimethyl dichlorosilane and phenyl trichlorosilane followed by neutralization, washing with water and drying;

7 parts of an organohydrogenpolysiloxane expressed by the structural formula

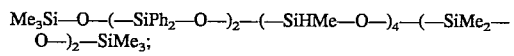

$Me_3Si-O-(-SiPh_2-O-)_2-(-SiHMe-O-)_4-(-SiMe_2-O-)_2-SiMe_3;$ 0.1 part of an isopropyl alcohol solution of chloroplatinic acid in a concentration of 0.5% by weight as platinum; and 0.6 part of tris(acetylacetonato) aluminum.

The resin composition A prepared above was compression-molded by heating in a metal mold at 130° C. for 15 minutes into a sheet of 2 mm thickness which had good transparency and no problem was encountered in removal of the sheet from the metal mold absolutely without adhesion. The cured resin sheet after post-curing at 150° C. for 2 hours had a Shore D hardness of 84 and a flexural strength of 9.2 kg/mm$^2$. These properties were measured after aging of the sample at 220° C. for 7 days to find that the Shore D hardness was increased to 85 and the flexural strength was decreased to 7.0 kg/mm$^2$.

EXAMPLE 2

Another curable resin composition, referred to as the resin composition B hereinafter, was prepared by uniformly blending:
100 parts of the same epoxy resin as used in Example 1 (Epikote 828, supra); 20 parts of the same diepoxide compound 3,4-epoxycyclohexylmethyl 3,4-epoxycyclohexane carboxylate;
100 parts of the same organopolysiloxane as used in Example 1;
12 parts of an organohydrogenpolysiloxane expressed by the structural formula $$Me_3Si\text{—}O\text{—}(\text{—}SiHMe\text{—}O\text{—})_4\text{—}SiMe_3;$$

0.3 part of the same isopropyl alcohol solution of chloroplatinic acid as used in Example 1; and
0.8 part of tris(acetylacetonato) aluminum.

The resin composition B prepared above was compression-molded by heating in a metal mold at 130° C. for 15 minutes into a sheet of 2 mm thickness which had good transparency and no problem was encountered in removal of the sheet from the metal mold absolutely without adhesion. The cured resin sheet after post-curing at 150° C. for 2 hours had a Shore D hardness of 84 and a flexural strength of 8.8 kg/mm$^2$. These properties were measured after aging of the sample at 220° C. for 7 days to find that the Shore D hardness was unchanged but the flexural strength was decreased to 8.0 kg/mm$^2$.

COMPARATIVE EXAMPLE 1

A comparative resin composition, referred to as the resin composition C hereinafter, was prepared by uniformly blending:
100 parts of the same epoxy resin as used in Example 1 (Epikote 828, supra);
2.0 parts of diphenyl silane diol; and
0.5 part of aluminum benzoate.

The resin composition C prepared above was compression-molded by heating in a metal mold at 130° C. for 15 minutes into a sheet of 2 mm thickness which had good transparency but could not be taken out of the metal mold unless the metal mold was subjected to a mold-release treatment beforehand with a fluorocarbon-based releasing agent. The cured resin sheet after post-curing at 150° C. for 2 hours had a Shore D hardness of 86 and a flexural strength of 10.0 kg/mm$^2$. These properties were measured after aging of the sample at 220° C. for 7 days to find that the Shore D hardness was increased to 89 but the flexural strength was decreased to 5.1 kg/mm$^2$.

What is claimed is:

1. A curable organopolysiloxane-epoxy resin composition which comprises, as a uniform blend:
   (a) 100 parts by weight of an epoxy resin;
   (b) from 10 to 500 parts by weight, based on (a), of an organopolysiloxane represented by the average compositional formula $$R_a(HO)_b SiO_{(4-a-b)/2},$$

in which R is an unsubstituted or substituted monovalent hydrocarbon group having 1 to 10 carbon atoms, at least 1% by mole of the groups denoted by R in a molecule being alkenyl groups, the subscript a is a positive number not smaller than 1 but smaller than 3 and the subscript b is a positive number in the range from 0.05 to 2 with the proviso that a+b is larger than 1 but not exceeding 3;
   (c) an organohydrogenpolysiloxane having, in a molecule, at least two hydrogen atoms directly bonded to the silicon atoms in an amount in the range from 1 to 50% by weight based on the amount of the component (b);
   (d) a compound of a platinum-group metal hydrosilation catalyst in an amount in the range from 0.1 to 500 ppm by weight based on the amount of the component (b); and
   (e) from 0.001 to 10 parts by weight, based on (a), of an organic aluminum compound capable of catalyzing the reaction of epoxy and silanol groups.

2. The curable organopolysiloxane-epoxy resin composition as claimed in claim 1 in which the epoxy resin as the component (a) has an epoxy equivalent in the range from 120 to 800 and a molecular weight in the range from 150 to 350.

3. The curable organopolysiloxane-epoxy resin composition as claimed in claim 1 in which the subscripts a and b in the average compositional formula representing the component (b) have values not smaller than 1.5 but smaller than 2.5 and from 0.1 to 1.5, respectively, with the proviso that a+b is in the range from 1.7 to 2.2.

4. The curable organopolysiloxane-epoxy resin composition as claimed in claim 1 in which from 2 to 20% by moles of the groups denoted by R in the average compositional formula representing the component (b) are alkenyl groups.

5. The curable organopolysiloxane-epoxy resin composition as claimed in claim 1 in which the number of silicon-bonded hydrogen atoms in the organohydrogenpolysiloxane as the component (c) is in the range from 2 to 20 per molecule.

6. The curable organopolysiloxane-epoxy resin composition as claimed in claim 1 in which the compound of a platinum-group metal is chloroplatinic acid.

7. The curable organopolysiloxane-epoxy resin composition as claimed in claim 1 in which the amount of the organic aluminum compound as the component (e) is in the range from 0.1 to 5 parts by weight per 100 parts by weight of the component (a).

8. The curable organopolysiloxane-epoxy resin composition as claimed in claim 1 in which from 20 to 80% by moles of the groups denoted by R in the average compositional formula representing the component (b) are phenyl groups.

* * * * *